Oct. 25, 1927.  
A. S. JOHNSON  
1,646,539  
BRAKE MECHANISM FOR LOOMS  
Filed July 24, 1925  
2 Sheets-Sheet 1

Inventor.  
Arthur S. Johnson  
by Heard Smith & Tennant  
Attys.

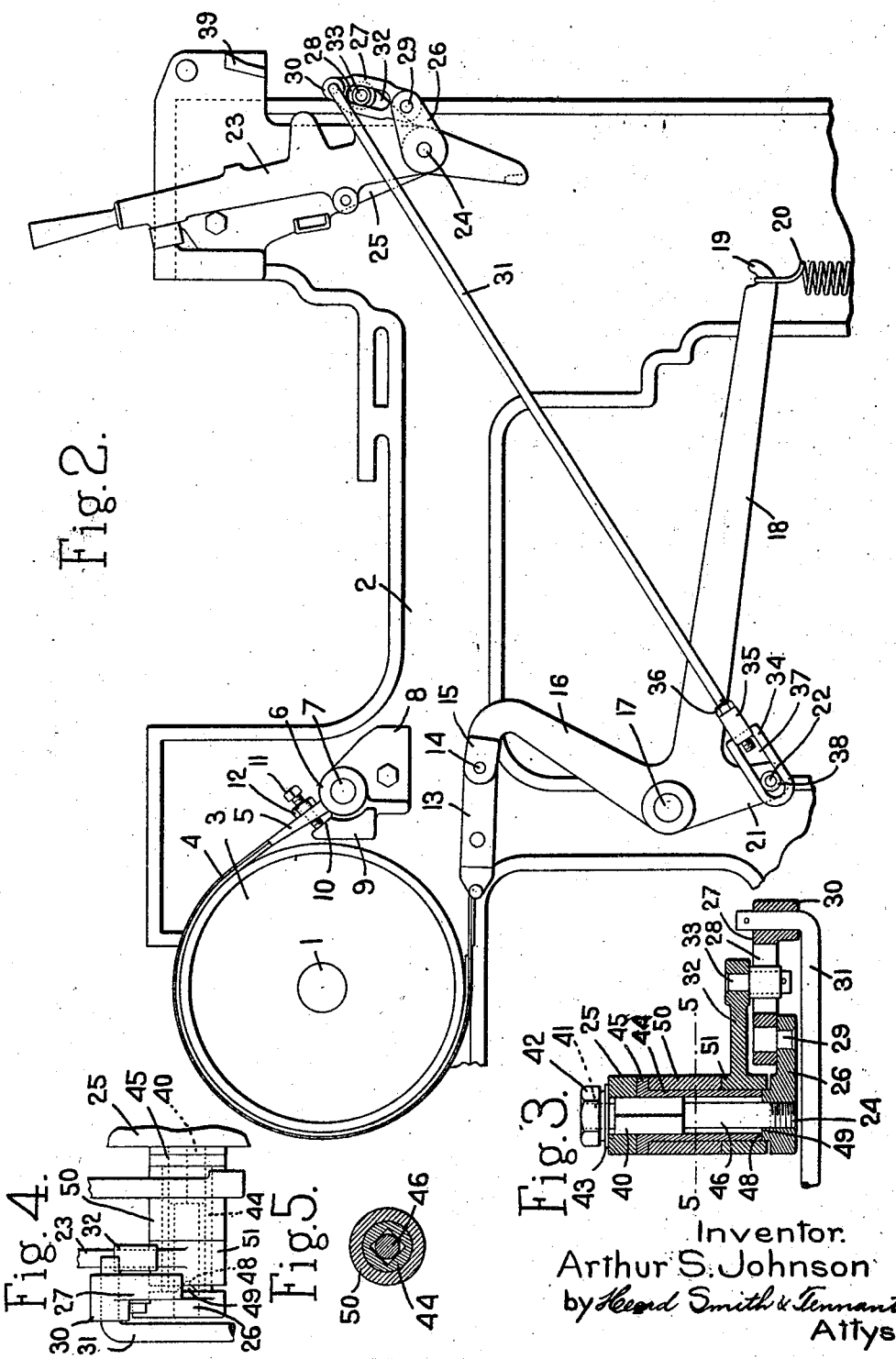

Patented Oct. 25, 1927.

1,646,539

UNITED STATES PATENT OFFICE.

ARTHUR S. JOHNSON, OF HOPEDALE, MASSACHUSETTS, ASSIGNOR TO DRAPER CORPORATION, OF HOPEDALE, MASSACHUSETTS, A CORPORATION OF MAINE.

BRAKE MECHANISM FOR LOOMS.

Application filed July 24, 1925. Serial No. 45,922.

This invention relates to improvements in braking mechanisms for looms having a brake drum, a co-operating brake and a spring-actuated device normally tending to apply the brake, a brake lever and means connecting the brake lever to the brake-applying device operable when the brake lever is moved to running position to move said brake-applying device against the action of the spring in such manner as to release the brake. In usual constructions the connection between the brake lever and the brake-applying device is such that the full movement of the brake lever produces a relatively short movement of the brake-applying device which, unless accurate adjustment of the brake is provided, will permit more or less of a drag upon the brake drum. Furthermore in usual constructions the connections between the brake lever and the brake is such that when the brake lever is in stopping position the spring of the brake-applying device is prevented from applying its full braking force.

One of the objects of the invention is to provide means operable by a brake lever of the usual type which will increase the effective range of brake-releasing movement of the brake lever upon the brake-applying device.

Another object of the invention is to provide mechanism for connecting the brake lever to the braking drum which will allow a sufficient amount of lost motion between the brake-applying device and the means connecting it to the brake lever to permit the utilization of the full force of the spring of the brake-applying device. This is permitted in the present invention by reason of the increased range of effective brake-releasing movement of the brake lever upon the brake-applying device above mentioned.

A further object of the invention is to provide a novel device for the fulcrum of the brake lever for accomplishing the purposes above mentioned which can be applied to a usual type of shipper stand.

Other objects and features of the invention will more fully appear from the following description and the accompanying drawings and will be particularly pointed out in the claims.

Inasmuch as the invention relates solely to the braking mechanism for looms only so much of the loom structure is illustrated as will show the manner in which the invention is applied to the loom.

In the drawings:

Fig. 2 is a similar view illustrating the brake lever in stopping position, the shipper being omitted;

Fig. 3 is a detail sectional view on line 3—3 Fig. 1;

Fig. 4 is a detail side elevation of the construction illustrated in Fig. 3 viewed from the left of Fig. 1; and, Fig. 5 is a detail sectional view on line 5—5 Fig. 3 viewed downwardly.

Figure 1:
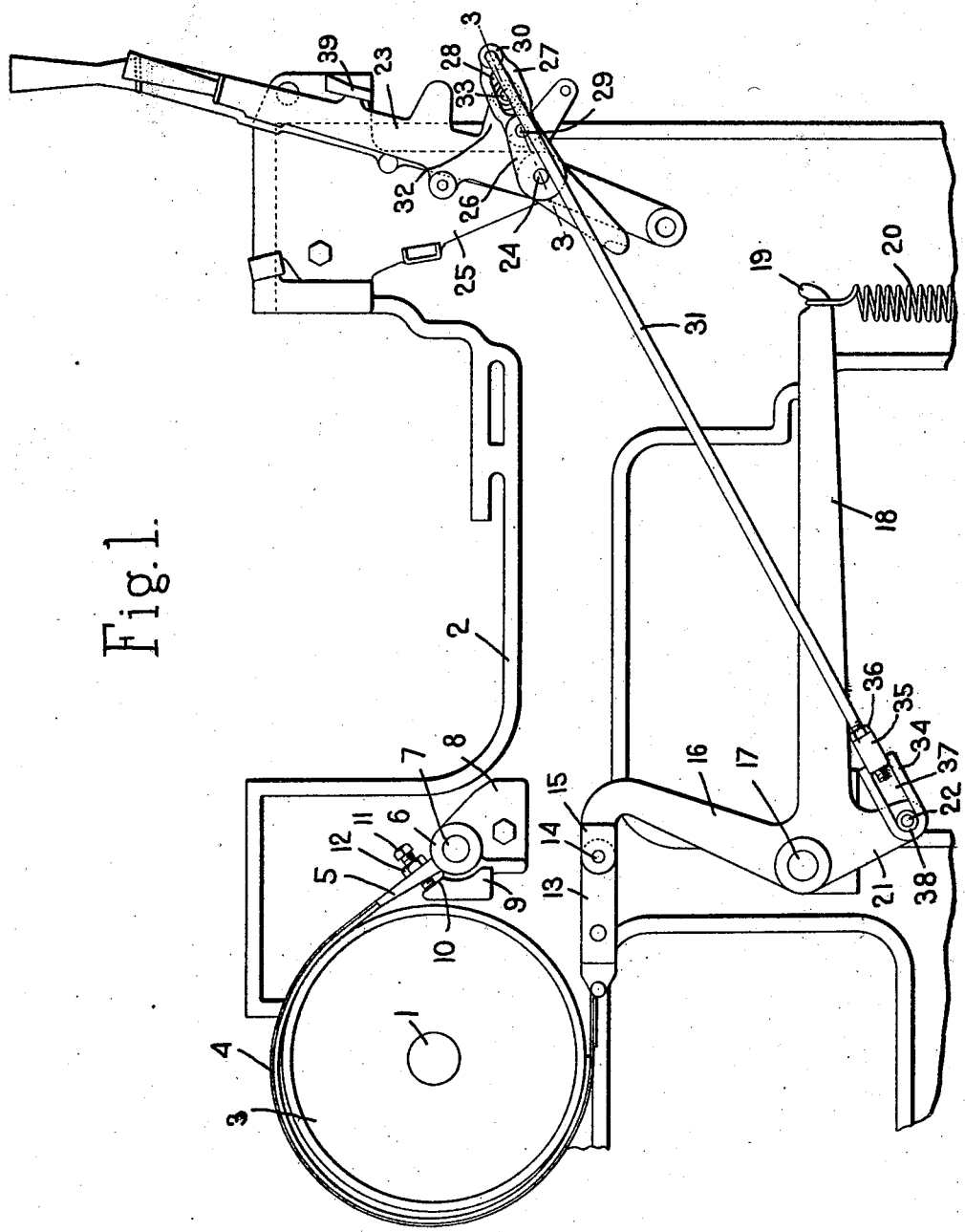
Fig. 1 is a side elevation of one of the loom sides showing the braking mechanism embodying the present invention applied thereto, the brake lever and shipper being shown in running position.

In the construction illustrated in the drawings the main shaft 1 of the loom is journalled in suitable bearings in the loom sides 2, one of which is shown in the drawings. A brake drum 3 is fixedly secured upon the main shaft 1 and a co-operating brake 4 in the form of a flexible band or strap surrounds the greater portion of the brake drum 3. One end of the brake 4 is secured to an anchoring block or plate 5 having a cylindrical end 6 which is pivotally mounted upon a stud 7 projecting from a bracket 8 which is secured to the loom side. The bracket 8 has an extension 9 provided with an angularly disposed shoulder 10 which is engaged by the end of an adjusting screw 11 which is mounted in the block 5 and is secured in adjusted position by a set nut 12. By adjusting the position of the block or plate 5 the brake may be caused to engage a greater or less amount of the surface of the drum 3 and consequently the amount of braking action can be regulated. The opposite end of the brake 4 is secured to a connector or link 13 which in turn is pivotally connected to a spring-actuated brake-applying device.

In the construction illustrated the end of the link 13 is pivotally mounted upon a pin 14 which extends through the bifurcated end 15 of one arm 16 of a bell crank lever which is pivotally mounted upon a stud 17 projecting from the loom side. Another arm 18 of the bell crank lever has a notch or hooked end 19 which is engaged by a helical spring 20 suitably anchored at its opposite end to the loom side and which acts normally to depress the arm 18 thereby acting to set the brake upon the drum. The bell crank lever is provided with another arm 21 which has a laterally extending stud 22 which in prior constructions is directly connected by a link to a stud projecting from the brake lever 23. The link connection in prior constructions is such that the movement of the lever from running position to stopping position rocks the bell crank lever, which forms the brake-applying device, but a short distance and at times prevents the spring from exerting its full braking force upon the brake.

The present invention is designed to increase the effective range of brake-releasing movement of the brake lever and also to provide means whereby the spring 20 may normally apply its full force to the brake. This is accomplished by interposing between the brake lever and the means which connect the brake lever to the brake-applying bell crank a device which will increase or multiply the motion or the range of movement of the connecting means when the brake lever is moved from running position to stopping position.

In the preferred embodiment of the invention illustrated herein the brake lever 23 is fulcrumed upon a novel form of post 24 which is mounted at the lower end of the usual shipper bracket 25 which is suitably secured to the loom side. In the construction illustrated in Figs. 1 and 2 a plate 26 is fixedly secured to the end of the post 24 and extends laterally therefrom. A lever 27, having a longitudinal slot 28 therein or therethrough, is fulcrumed upon a stud 29 on the plate 26. The opposite end of the lever 27 is provided with a cylindrical boss 30 having an aperture therethrough which receives the laterally bent end of a connecting member or rod 31, the opposite end of which engages or is connected to the stud 22 on the arm 21 of the bell crank lever which forms the brake-applying device. The brake lever 23 has a laterally extending arm 32 which is provided with a stud 33 extending into the slot 28 of the lever 27. The stud 33 desirably is provided with an anti-friction roller which slidably and rotatably fits within the slot 28 in the slotted lever 27. The end of the connecting member or rod 31 desirably has a lost motion connection to the stud 22.

In the preferred embodiment of the invention illustrated herein a coupling member 34 is provided which has an internally screw threaded shank 35 mounted upon the screw threaded lower end of the rod 31 so that the coupling member may be adjusted to lengthen or shorten the effective length of the rod 31. A lock nut 36 upon the rod 31 serves to retain the shank 35 tightly in position. The coupling member 34 has a slot 37 which extends in the direction of the axis of the rod and receives the stud 22 which projects laterally from the arm 21 of the brake-applying bell crank lever. The stud 22 also desirably is provided with a roller 38 which slidably and rotatable fits within the slot 37.

In the operation of the device the brake lever 23 when moved to starting position, as illustrated in Fig. 1, acting through the stud 33, swings the slotted lever 27 into the position illustrated in Fig. 1 so that the brake lever rests against an abutment 39 projecting from the shipper stand. When in this position the rod 31, which connects the end of the slotted lever 27 to the stud 22 of the brake-applying device, lies slightly below the pivot or fulcrum of the slotted link 27 upon the plate 26 and also slightly below the fulcrum 24 of the brake lever 23. By reason of this construction the brake lever is effectively locked in running position as illustrated in Fig. 1. It will be obvious that the range of movement of the rod 31, which is connected to the brake-applying lever, is greatly increased over the range of movement produced in usual constructions where the rod 31 directly connects the stud 22 of the brake-applying device with the stud 33 of the brake lever as the arc of movement of the stud 33 in passing from stopping position, illustrated in Fig. 2, to running position, illustrated in Fig. 1, is relatively short, whereas the movement of the end of the slotted lever 27 is comparatively great by reason of the fact that the lever 27 swings about the fulcrum 29 as it is actuated by the stud 33 in its arcuate movement and along the slot 28 in the slotted lever 27. By reason of this increased effective range of brake-releasing movement of the brake lever upon the brake-applying device complete release of the brake from effective engagement with the brake drum is permitted.

By reason of the lost motion connection between the end of the rod 31 and the stud 22 on the brake-applying device, which is permitted by the slotted coupling member 34, the stud 22 is completely removed from engagement with the end of the coupling, as illustrated in Fig. 2, when the shipper is moved to stopping position, so that the spring 20 is enabled to apply its full force to the brake-applying device and through it to the brake.

The particular mechanism for providing a fulcrum for the brake lever and the shipper, and also providing a suitable fulcrum for the slotted lever 27, is illustrated in Figs. 3 and 4 of the drawing. In the construction illustrated the shipper-supporting bracket 25 is provided with a rectangular aperture in which a complementary rectangular section 40 of a fulcrum post for the shipper and brake lever is mounted. This shipper post is provided with a cylindrical screw threaded end 41 which extends through the side of the shipper bracket 25 and has upon it a clamping nut 42 with a washer 43 interposed between the nut and the bracket. A sleeve 44 having a rectangular aperture therethrough fits upon the rectangular portion 40 of the fulcrum post and is provided with a flanged end 45 which abuts against said bracket. The fulcrum post is provided with a cylindrical section 46 which has a screw threaded end upon which the plate 26 is screwed, the plate 26 abutting against the end of the sleeve 44. The sleeve 44 has a pair of diametrically opposite V-shaped notches 48 which are engaged by complementary V-shaped projections 49 upon the plate 26. Obviously when the nut 42 is set up the plate 26 is fixedly secured to the post in a permanent position. The hub 50 of the shipper is pivotally mounted upon the sleeve 44 as is also the hub 51 of the brake lever. The arm 32 of the brake lever extends laterally and the stud 33 therein, with the roller which is mounted upon it, engages the slot 28 in the slotted lever 27 which is fulcrumed upon the stud 29.

By reason of this construction the present invention can be readily applied to usual brake constructions for looms without material modification thereof.

It will be understood that the preferred embodiment of the invention disclosed in the accompanying drawings is of an illustrative character and is not restrictive, and that various modifications in form, construction and arrangement of parts may be made within the spirit and scope of the following claims.

Having thus described the invention, what is claimed as new, and desired to be secured by Letters Patent, is:

1. Braking mechanism for looms having a brake drum, a co-operating brake, a spring-actuated device normally tending to apply the brake, a brake lever, connecting means engaging the brake applying device, and a motion-multiplying connection between the brake lever and the said connecting means.

2. Braking mechanism for looms having a brake drum, a co-operating brake, a spring-actuated device normally tending to apply the brake, a brake lever, connecting means engaging the brake-applying device, a motion-multiplying connection between the brake lever and the said connecting means, and means normally permitting lost motion between said connecting means and said brake-applying device, whereby the normal brake-applying movement of said device will not be restricted.

3. Braking mechanism for looms having a brake drum, a co-operating brake, a spring-actuated device normally tending to apply the brake, a brake lever, a member pivotally movable upon an axis located at a distance from the fulcrum of said brake lever, a stud upon said brake lever movably engaging said member and acting to move the free end of said member a greater distance than the range of movement of said stud and a link connecting the free end of said member to said brake-applying device.

4. Braking mechanism for looms having a brake drum, a co-operating brake, a spring-actuated device normally tending to apply the brake, a brake lever, a member pivotally movable upon an axis located at a distance from the fulcrum of said brake lever, a stud upon said brake lever movably engaging said member and acting to move the free end of said member a greater distance than the range of movement of said stud and a link connecting the free end of said member to said brake-applying device, the said member being so pivoted that when the brake lever is moved to running position the connecting link will lie slightly below the plane passing through the pivot of said member and the said stud, thereby locking the brake-applying device in position effectively to release the brake from engagement with the brake drum.

5. Braking mechanism for looms having a brake drum, a co-operating brake, a spring-actuated device normally tending to apply the brake and a shipper stand, a post mounted upon the shipper stand, a brake lever fulcrumed upon said post, a plate fixedly secured to said post, a slotted lever fulcrumed at one end upon said plate, means connecting the opposite end of said lever to said brake-applying device and a stud on said brake lever slidably mounted in the slot in said lever operable upon movement of said brake lever to increase the effective range of brake-releasing movement of said brake lever upon said brake-applying device.

6. Braking mechanism for looms having a brake drum, a co-operating brake, a spring-actuated device normally tending to apply the brake and a shipper stand, a post mounted upon the shipper stand, a brake lever fulcrumed upon said post, a plate fixedly secured to said post, a slotted lever fulcrumed at one end upon said plate, a link pivotally connected at one end to the opposite end of said slotted lever and having a lost motion connection at its opposite end to said brake-applying device and a stud on said brake lever slidably mounted in the slot in said lever operable upon movement of said brake lever to increase the effective range of brake-releasing movement of said brake lever upon said brake-applying device.

7. Braking mechanism for looms having a brake drum, a co-operating brake, a spring-actuated device normally tending to apply the brake and a shipper stand, a post having a rectangular section mounted in a complementary rectangular aperture in said shipper stand, said post having screw threaded cylindrical end sections and provided with an intermediate rectangular section mounted in an aperture in said shipper stand having walls complementary to said rectangular section, a sleeve having inner walls complementary to said rectangular section, a plate secured to the end of said cylindrical section and abutting against said sleeve, a nut upon the opposite end of said post acting to clamp said sleeve and post upon said shipper stand, a slotted lever pivotally mounted upon said plate, a link connecting the opposite end of said slotted lever to said brake-applying device and a shipper lever fulcrumed upon said sleeve having a stud slidably mounted in the slot in said slotted lever, whereby the effective range of brake-releasing movement of said brake lever upon said brake-applying device will be increased.

8. Braking mechanism for looms having a brake drum, a co-operating brake, a spring-actuated device normally tending to apply the brake and a shipper stand, a post having a rectangular section mounted in a complementary rectangular aperture in said shipper stand, said post having screw threaded cylindrical end sections and provided with an intermediate rectangular section mounted in an aperture in said shipper stand having walls complementary to said rectangular section, a sleeve having inner walls complementary to said rectangular section, a plate secured to the end of said cylindrical section and abutting against said sleeve, a nut upon the opposite end of said post acting to clamp said sleeve and post upon said shipper stand, a slotted lever pivotally mounted upon said plate, a link connecting the opposite end of said slotted lever to said brake-applying device including a slotted member engaging a stud upon said brake-applying device and adjustably secured upon said link and a shipper lever fulcrumed upon said sleeve having a stud slidably mounted in the slot in said slotted lever, whereby the effective range of brake-releasing movement of said brake lever upon said brake-applying device will be increased.

In testimony whereof, I have signed my name to this specification.

ARTHUR S. JOHNSON.